United States Patent
Martino

(10) Patent No.: US 7,394,423 B2
(45) Date of Patent: *Jul. 1, 2008

(54) INTERNET PROTOCOL BASED 911 SYSTEM

(76) Inventor: Monica Rose Martino, 7436 Breckenridge Dr., Plano, TX (US) 75025

( * ) Notice: Subject to any disclaimer, the term of this patent is extended or adjusted under 35 U.S.C. 154(b) by 58 days.

This patent is subject to a terminal disclaimer.

(21) Appl. No.: 11/142,722

(22) Filed: Jun. 1, 2005

(65) Prior Publication Data
US 2006/0004905 A1    Jan. 5, 2006

Related U.S. Application Data

(63) Continuation of application No. 10/690,346, filed on Oct. 21, 2003, now Pat. No. 6,927,727.

(60) Provisional application No. 60/441,632, filed on Jan. 21, 2003.

(51) Int. Cl.
*H04B 7/185* (2006.01)
(52) U.S. Cl. .............................. 342/357.07; 342/357.06
(58) Field of Classification Search ............ 342/357.01, 342/357.06, 357.07, 357.09; 701/207, 213; 340/531, 573.1
See application file for complete search history.

(56) References Cited

U.S. PATENT DOCUMENTS

| | | | |
|---|---|---|---|
| 5,479,482 A | 12/1995 | Grimes | |
| 5,835,907 A | 11/1998 | Newman | |
| 5,914,675 A | 6/1999 | Tognazzini | |
| 6,104,712 A | 8/2000 | Robert et al. | |
| 6,141,341 A | 10/2000 | Jones et al. | |
| 6,259,695 B1 | 7/2001 | Pfek | |
| 6,298,229 B1 | 10/2001 | Tomlinson, Jr. et al. | |
| 6,340,928 B1 | 1/2002 | McCurdy | |
| 6,927,727 B2 * | 8/2005 | Cleghorn | 342/357.07 |
| 2004/0008253 A1 | 1/2004 | Monroe et al. | |
| 2004/0088345 A1 | 5/2004 | Zellner et al. | |

* cited by examiner

*Primary Examiner*—Dao L Phan
(74) *Attorney, Agent, or Firm*—RG & Associates

(57) ABSTRACT

The present invention provides a system, method and apparatus for initiating and handling an emergency IP request using an IP enabled device having GPS capability. The IP enabled device is monitored for one or more emergency criteria. If the emergency criteria are satisfied, global positioning data is obtained using the GPS capability and the emergency IP request is sent to an address server. The address server receives the emergency IP request, obtains local emergency services data based on the global positioning data, dials a call center station based on the local emergency services data and passes an emergency call from the IP enabled device to the call center station. This invention can be implemented as a computer program embedded in a computer readable medium wherein the steps are performed by one or more code segments.

34 Claims, 3 Drawing Sheets

INTERNET PROTOCOL BASED 911 SYSTEM

PRIORITY CLAIM

This patent application is a continuation of and claims priority of patent application Ser. No. 10/690,346, filed on Oct. 21, 2003 now U.S. Pat. No. 6,927,727, and entitled INTERNET PROTOCOL BASED 911 SYSTEM, which is based on and claims priority of provisional patent application No. 60/441,632, filed on Jan. 21, 2003, and entitled INTERNET PROTOCOL BASED 911 SYSTEM. This patent application is also related to patent application docket number IPE CONT 2, entitled INTERNET PROTOCOL BASED 911 SYSTEM, filed on even date herewith.

FIELD OF THE INVENTION

The present invention relates generally to the field of communications and, more particularly, to an Internet Protocol based 911 system.

BACKGROUND OF THE INVENTION

There are many systems for providing 911 services to cellular phones. But these systems are not designed to work in Internet Protocol ("IP") or voice over IP ("VoIP") systems. These systems do not have no way to match a location or address to an IP address because an IP address does not have a physical address or telephone number associated with it. Accordingly, there is a need for an IP based 911.

SUMMARY OF THE INVENTION

The present invention provides software applications that communicate with Global Positioning Systems ("GPS") hardware embedded in Internet Protocol ("IP") enabled equipment such that when the equipment is used to access emergency services by entering 911 or pressing an emergency activation button, the software provides the means to determine the location of the calling equipment to the respective emergency service center appropriate to the location of the emergency. More specifically, the software monitors the voice over IP ("VoIP") software installed on the IP enabled equipment. When 911 is entered, the software acquires the vertical and horizontal coordinates ("V&H") from the GPS hardware, overrides the installed VoIP software to send a Session Initiation Protocol ("SIP") request to an address server which is also monitoring the Internet for these specific sessions. The address server accepts the SIP from the originating hardware, receives the V&H and accesses a database that cross references emergency services direct dial numbers with the V&H. The address server passes the voice call and the available direct dial numbers to a call center that handles emergency voice interface with the person who entered 911 at the originating equipment. The call center operator chooses which emergency service to dial after speaking with the person who has the emergency, or defaults to the fire rescue number.

The present invention is applicable to both wireline and IP telephony systems, such as laptop computers, PDAs, etc. The present invention does not rely on a set IP address, so that it will work on virtual networks and with transactional IP addresses. GPS coordinates are cross referenced to the closest physical emergency services. For example, the system may provide four numbers or more number to the operator (police, fire, poison control, emergency medical services, rescue, etc.). The operator selects the appropriate number and routes the call via PSTN or directly to the IP address. Note that this invention does not required fixed equipment and is primarily designed for stationary or portable voice or IP enabled devices rather than mobile phones. The present invention completes the IP telephony service.

The present invention provides a method for initiating an emergency IP request using an IP enabled device having GPS capability. The method includes monitoring the IP enabled device for one or more emergency criteria, and obtaining global positioning data using the GPS capability and sending the emergency IP request whenever the one or more emergency criteria are satisfied. This method can be implemented as a computer program embedded in a computer readable medium wherein the steps are performed by one or more code segments.

The present invention also provides a method for handling an emergency IP request from an IP enabled device having GPS capability. The method includes receiving the emergency IP request containing global positioning data for the IP enabled device, obtaining local emergency services data based on the global positioning data, dialing a call center station based on the local emergency services data and passing an emergency call from the IP enabled device to the call center station. This method can be implemented as a computer program embedded in a computer readable medium wherein the steps are performed by one or more code segments.

In addition, the present invention provides an apparatus having an IP enabled device, a GPS component within the IP enabled device and an emergency IP component within the IP enabled device. The emergency IP component monitors the IP enabled device for one or more emergency criteria, and obtains global positioning data from the GPS component and sends the emergency IP request whenever the one or more emergency criteria are satisfied.

Moreover, the present invention provides a system having an address server and a database communicably coupled to the address server. The address server receives an emergency IP request containing global positioning data for an IP enabled device, obtains local emergency services data based on the global positioning data and provides emergency information to one or more emergency services based on the local emergency services data.

Other features and advantages of the present invention will be apparent to those of ordinary skill in the art upon reference to the following detailed description taken in conjunction with the accompanying drawings.

BRIEF DESCRIPTION OF THE DRAWINGS

The above and further advantages of the invention may be better understood by referring to the following description in conjunction with the accompanying drawings, in which.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

The present invention provides software applications that communicate with Global Positioning Systems ("GPS") hardware embedded in Internet Protocol ("IP") enabled equipment such that when the equipment is used to access emergency services by entering 911 or pressing an emergency activation button, the software provides the means to determine the location of the calling equipment to the respective emergency service center appropriate to the location of the emergency. More specifically, the software monitors the voice over IP ("VoIP") software installed on the IP enabled equipment. When 911 is entered, the software acquires the vertical and horizontal coordinates ("V&H") from the GPS hardware, overrides the installed VoIP software to send a Session Initiation Protocol ("SIP") request to an address server which is also monitoring the Internet for these specific sessions. The address server accepts the SIP from the originating hardware, receives the V&H and accesses a database that cross references emergency services direct dial numbers with the V&H. The address server passes the voice call and the available direct dial numbers to a call center that handles emergency voice interface with the person who entered 911 at the originating equipment. The call center operator chooses which emergency service to dial after speaking with the person who has the emergency, or defaults to the fire rescue number.

The present invention is applicable to both wireline and IP telephony systems, such as laptop computers, PDAs, etc. The present invention does not rely on a set IP address, so that it will work on virtual networks and with transactional IP addresses. GPS coordinates are cross referenced to the closest physical emergency services. For example, the system may provide four numbers or more number to the operator (police, fire, poison control, emergency medical services, rescue, etc.). The operator selects the appropriate number and routes the call via PSTN or directly to the IP address. Note that this invention does not required fixed equipment and is primarily designed for stationary or portable voice or IP enabled devices rather than mobile phones. The present invention completes the IP telephony service.

Figure 1:
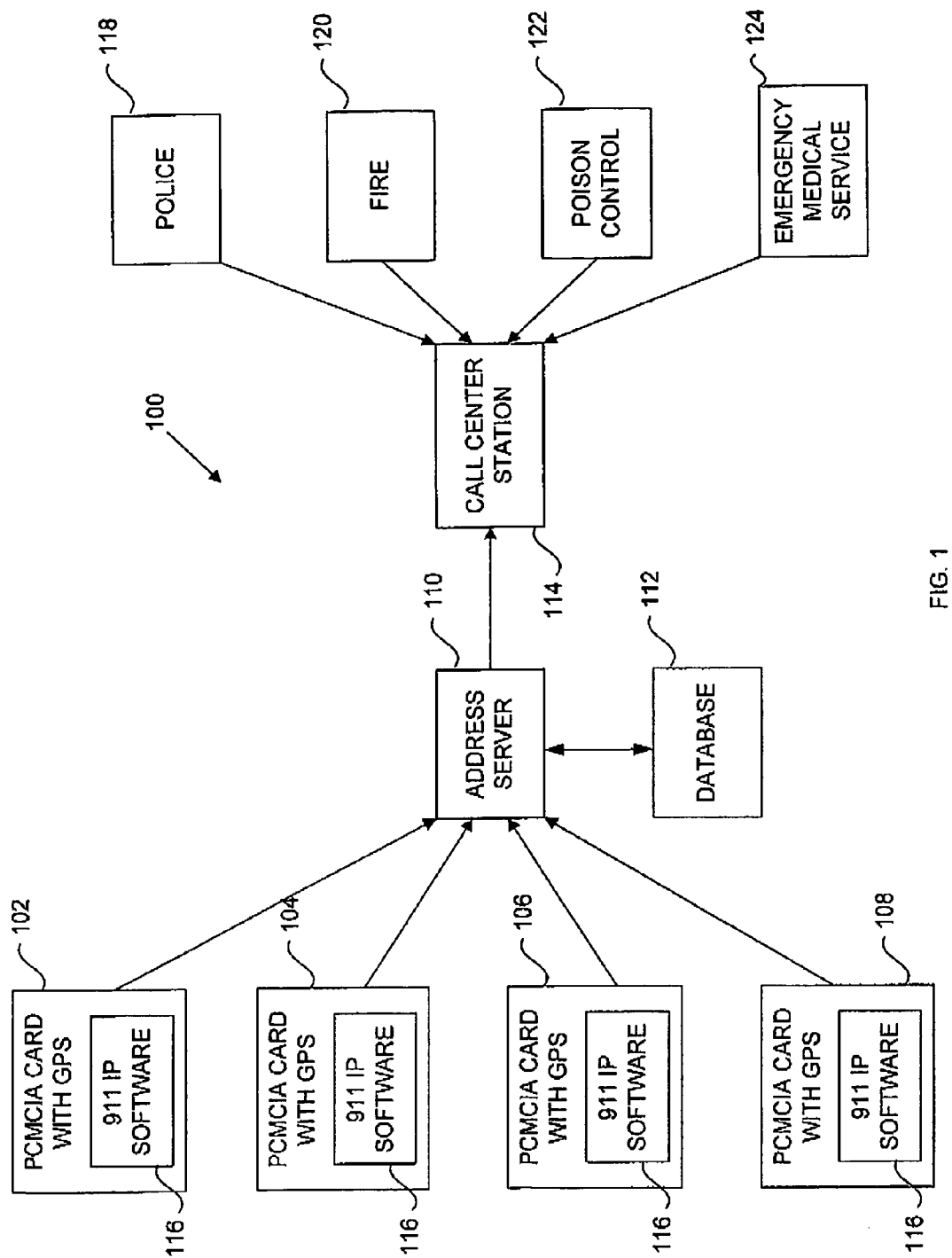
FIG. 1 depicts an IP based 911 system in accordance with one embodiment of the present invention.

Referring now to FIG. 1, an IP based 911 system 100 is depicted in accordance with one embodiment of the present invention. The system 100 includes one or more IP enabled devices 102, 104, 106 and 108, an address server 110, a database 112 and one or more call center stations 114. The IP enabled devices can be a PCMCIA card 102, PCI card 104, IP Phone 106 or other IP enabled device 108 (e.g., a personal data assistant, computer, etc.) all of which are equipped with GPS capability (a GPS component or hardware). In addition, the IP enabled devices 102, 104, 106 or 108 may be part of or attached to another device, such as a computer. Each IP enabled device 102, 104, 106 and 108 is also equipped with an instance of 911 IP software 116, which is also referred to as an emergency IP component. The IP enabled devices 102, 104, 106 and 108 are communicably coupled to the address server 110 via the devices' standard connection to a wide area network, such as the Internet. The address server 110 is communicably coupled to the database 112 via a direct connection, local area network, wide area network or other standard connections. The address server 110 is communicably coupled to the call center station 114 via local area network, wide area network or the Internet. The call center station 114 can place a PSTN direct dial call to any emergency service as is required by the circumstances, such as police 118, fire 120, poison control 122, emergency medical service 124, or other entity.

The 911 IP software 116 monitors the IP enabled device 102, 104, 106 or 108 for one or more emergency criteria, which may include entry of an emergency code, a 911 signal, a panic signal, an emergency activation button, a sensor alarm (e.g., collision, heat, smoke, vital signs, etc.) or an emergency condition specific signal (e.g., fire, police, ambulance, etc.). If the one or more emergency criteria are satisfied, the 911 IP software 116 obtains global positioning data (e.g., vertical and horizontal coordinates, a longitude, a latitude and an altitude for the IP enabled device 102, 104, 106 or 108) from the GPS component and sends an emergency IP request to the address server 110 via the network (not shown). The emergency IP request is SIP request or similar message containing the global positioning data.

Once the address server 110 receives the emergency IP request, the address server 110 obtains local emergency services data based on the global positioning data, dials the call center station 114 (e.g., an emergency services operator, etc.) based on the local emergency services data and passes an emergency call from the IP enabled device 102, 104, 106 or 108 to the call center station 114. The address server 110 may also provides a telephone number for one or more local emergency service providers 118, 120, 122, 124 to the call center station 114 based on the local emergency services data. The local emergency service providers may also include an emergency call center, coast guard, military, federal agency or rescue unit. The address server 110 may also provide the global positioning data to the call center station 114.

Figure 2:
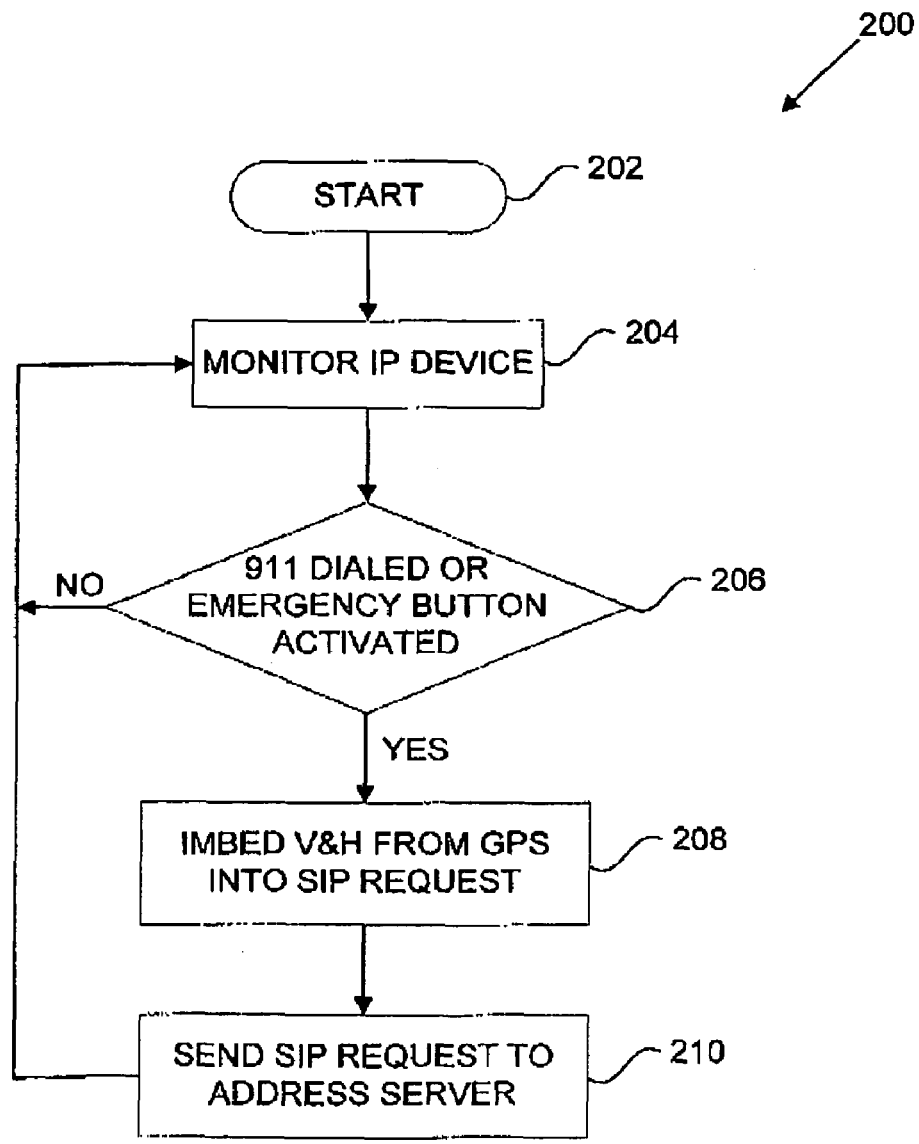
FIG. 2 is a flowchart illustrating the 911 software process in accordance with one embodiment of the present invention.

Now referring to FIG. 2, a flowchart illustrating the 911 software 116 (FIG. 1) process 200 in accordance with one embodiment of the present invention is shown. The 911 software 116 (FIG. 1) 200 or emergency IP component starts in block 202 and monitors the IP enabled device 102, 104, 106 or 108 (FIG. 1) in block 204. Whenever one or more emergency criteria are satisfied, such as the user enters an emergency code, a 911 signal, a panic signal, an emergency activation button, a sensor alarm (e.g., collision, heat, smoke, vital signs, etc.) or an emergency condition specific signal (e.g., fire, police, ambulance, etc.), as determined in decision block 206, the 911 software 116 (FIG. 1) imbeds the global positioning data from the GPS into an emergency IP request or SIP request in block 208 and sends the SIP request to the address server 110 (FIG. 1) in block 210. Thereafter, the process continues to monitor the IP enabled device 102, 104, 106 or 108 (FIG. 1) in block 204 and repeats the process as previously described. If, however, the user does not dial 911 or activate an emergency button, as determined in decision block 206, the 911 software 116 (FIG. 1) continues to monitor the IP enabled device 102, 104, 106 or 108 (FIG. 1) in block 204 and repeats the process as previously described. This method can be implemented as a computer program embedded in a computer readable medium wherein the steps are performed by one or more code segments.

Figure 3:
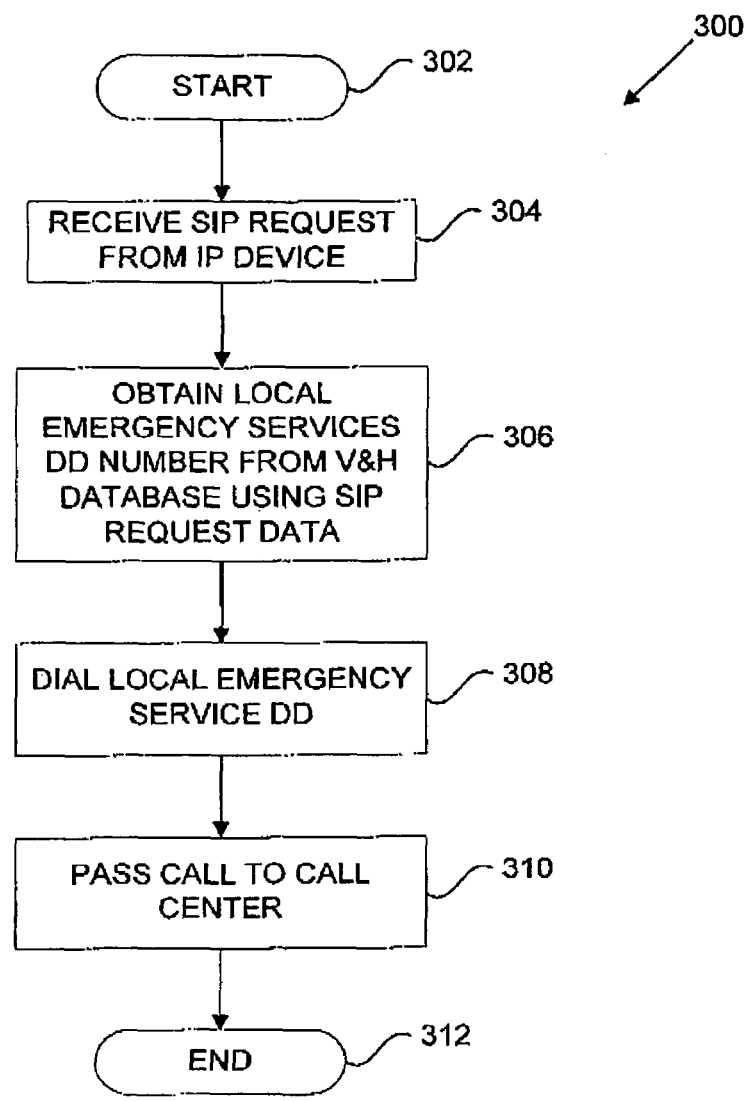
FIG. 3 is a flowchart illustrating the address server process in accordance with one embodiment of the present invention.

Referring now to FIG. 3, a flowchart illustrating the address server 110 (FIG. 1) process 300 in accordance with one embodiment of the present invention is shown. The address server 110 (FIG. 1) process 300 starts in block 302 and receives an emergency IP request or SIP request from an IP enabled device 102, 104, 106 or 108 (FIG. 1) in block 304. The local emergency services data, such as one or more direct dial numbers, is then obtained from the database 112 (FIG. 1) using data contained in the SIP request, such as the global positioning data, in block 306. The address server 110 (FIG. 1) then dials a call center station 114 (FIG. 1) based on the local emergency services data, which may be one of the local emergency service numbers or emergency services operator, in block 308. The emergency call is then passed to the call center station 114 (FIG. 1) in block 310 and ends in block 312. The address server 110 (FIG. 1) may also provides a telephone number for one or more local emergency service providers 118, 120, 122, 124 (FIG. 1) to the call center station 114 (FIG. 1) based on the local emergency services data. In addition, the address server 110 (FIG. 1) may provide the global positioning data to the call center station 114 (FIG. 1). Note that the address server 110 (FIG. 1) may continue to monitor the emergency call. The call center station 114 (FIG. 1) then determines how to handle the emergency call and may route the call to the police 118 (FIG. 1), fire 120 (FIG. 1), poison control 122 (FIG. 1), emergency medical service 124 (FIG. 1) or other appropriate entity (e.g., coast guard, military, federal agency, rescue unit, etc.). This method can be implemented as a computer program embedded in a computer readable medium wherein the steps are performed by one or more code segments.

Although preferred embodiments of the present invention have been described in detail, it will be understood by those skilled in the art that various modifications can be made therein without departing from the spirit and scope of the invention as set forth in the appended claims.

What is claimed is:

1. A computer program for handling an emergency Internet Protocol request from an Internet Protocol enabled device having Global Positioning Systems capability, the computer program comprising:
    a code segment for monitoring software on the Internet Protocol enabled device for at least one of: a collision, heat, smoke, and vital signs;
    a code segment for receiving the emergency Internet Protocol request containing global positioning data for the Internet Protocol enabled device, wherein the receiving is based on the monitored software;
    a code segment for obtaining local emergency services data based on the global positioning data;
    a code segment for dialing a call center station based on the local emergency services data; and
    a code segment for passing an emergency call from the Internet Protocol enabled device to the call center station.

2. The computer program as recited in claim 1, wherein the Internet Protocol enabled device is selected from a group consisting of a PCMCIA card, a PCI card, an Internet Protocol phone, a personal data assistant and a computer.

3. The computer program as recited in claim 1, wherein the emergency Internet Protocol request is sent whenever one or more emergency criteria are satisfied.

4. The computer program as recited in claim 3, wherein the one or more emergency criteria include entry of an emergency code, a 911 signal, a panic signal, an emergency activation button, a sensor alarm or an emergency condition specific signal.

5. The computer program as recited in claim 1, wherein the global positioning data includes vertical and horizontal coordinates.

6. The computer program as recited in claim 1, wherein the global positioning data includes a longitude, a latitude and an altitude for the Internet Protocol enabled device.

7. The computer program as recited in claim 1, wherein the emergency Internet Protocol request comprises a Session Initiation Protocol request.

8. The computer program as recited in claim 1, wherein the call center station is an emergency services operator.

9. The computer program as recited in claim 1, further comprising a code segment for providing a telephone number for one or more local emergency service providers to the call center station based on the local emergency services data.

10. The computer program as recited in claim 9, wherein the one or more local emergency service providers are selected from the group consisting of an emergency call center, police, fire, poison control, emergency medical services, coast guard, military, federal agency and rescue.

11. The computer program as recited in claim 1, further comprising a code segment for providing the global positioning data to the call center station.

12. An apparatus comprising:
    an Internet Protocol enabled device;
    a Global Positioning Systems component within the Internet Protocol enabled device; and
    an emergency Internet Protocol component within the Internet Protocol enabled device that monitors software on the Internet Protocol enabled device for at least one of: a collision, heat, smoke, and vital signs; obtains global positioning data from the Global Positioning Systems component and sends an emergency Internet Protocol request whenever one or more emergency criteria are satisfied.

13. The apparatus as recited in claim 12, wherein the Internet Protocol enabled device is selected from a group consisting of a PCMCIA card, a PCI card, an Internet Protocol phone, a personal data assistant and a computer.

14. The apparatus as recited in claim 12, wherein the one or more emergency criteria include entry of an emergency code, a 911 signal, a panic signal, an emergency activation button, a sensor alarm or an emergency condition specific signal.

15. The apparatus as recited in claim 12, wherein the global positioning data includes vertical and horizontal coordinates.

16. The apparatus as recited in claim 12, wherein the global positioning data includes a longitude, a latitude and an altitude for the Internet Protocol enabled device.

17. The apparatus as recited in claim 12, wherein the emergency Internet Protocol request comprises a Session Initiation Protocol request containing the global positioning data.

18. The apparatus as recited in claim 17, wherein the Session Initiation Protocol request is sent to an address server that obtains local emergency services data based on the global positioning data, dials a call center station based on the local emergency services data and passes an emergency call from the Internet Protocol enabled device to the call center station.

19. The apparatus as recited in claim 18, wherein the call center station is an emergency services operator.

20. The apparatus as recited in claim 18, wherein the address server further provides a telephone number for one or more local emergency service providers to the call center station based on the local emergency services data.

21. The apparatus as recited in claim 20, wherein the one or more local emergency service providers are selected from the group consisting of an emergency call center, police, fire, poison control, emergency medical services, coast guard, military, federal agency and rescue.

22. The apparatus as recited in claim 18, wherein the address server further provides the global positioning data to the call center station.

23. A system, comprising:
    a server adapted to receive an emergency Internet Protocol request containing global positioning data for an Internet Protocol enabled device after software on the device is overridden by an occurrence of at least one of: a collision, heat, smoke, and vital signs, obtain local emergency services data based on the global positioning data and provide emergency information to one or more emergency services based on the local emergency services data.

24. The system as recited in claim 23, further comprising:
a communications network communicably coupled to the server; and
one or more Internet Protocol enabled devices communicably coupled to the communications network.

25. The system as recited in claim 24, wherein the Internet Protocol enabled device is selected from a group consisting of a PCMCIA card, a PCI card, an Internet Protocol phone, a personal data assistant and a computer.

26. The system as recited in claim 24, wherein the emergency Internet Protocol request is sent whenever one or more emergency criteria are satisfied.

27. The system as recited in claim 26, wherein the one or more emergency criteria include entry of an emergency code, a 911 signal, a panic signal, an emergency activation button, a sensor alarm or an emergency condition specific signal.

28. The system as recited in claim 24, wherein the global positioning data includes vertical and horizontal coordinates.

29. The system as recited in claim 24, wherein the global positioning data includes a longitude, a latitude and an altitude for the Internet Protocol enabled device.

30. The system as recited in claim 24, wherein the emergency Internet Protocol request comprises a Session Initiation Protocol request.

31. The system as recited in claim 24, wherein the call center station is an emergency services operator.

32. The system as recited in claim 24, wherein the address server further provides a telephone number for one or more local emergency service providers to the call center station based on the local emergency services data.

33. The system as recited in claim 32, wherein the one or more local emergency service providers are selected from the group consisting of an emergency call center, police, fire, poison control, emergency medical services, coast guard, military, federal agency and rescue.

34. The system as recited in claim 24, wherein the address server further provides the global positioning data to the call center station.

* * * * *